Aug. 7, 1962 L. E. OBERHOLTZ 3,048,049
CONVEYER CHAIN
Filed March 4, 1960
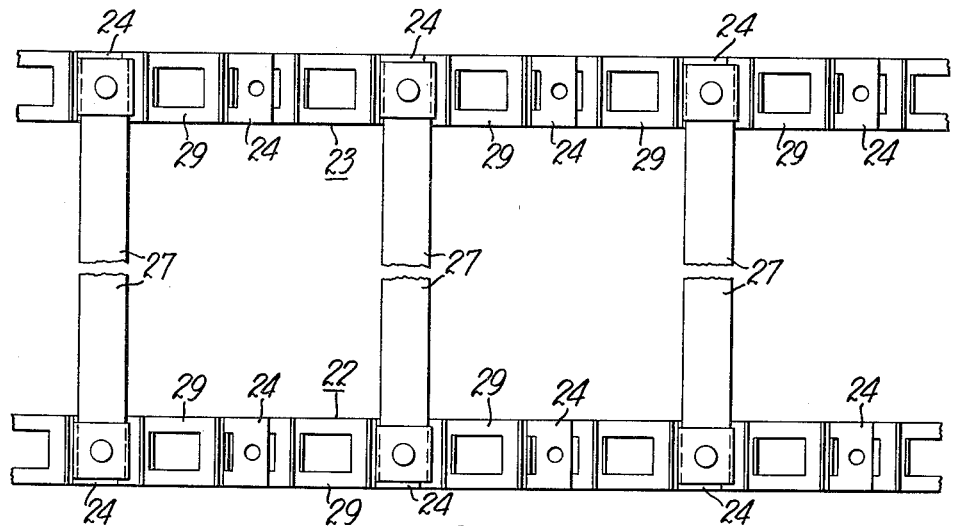
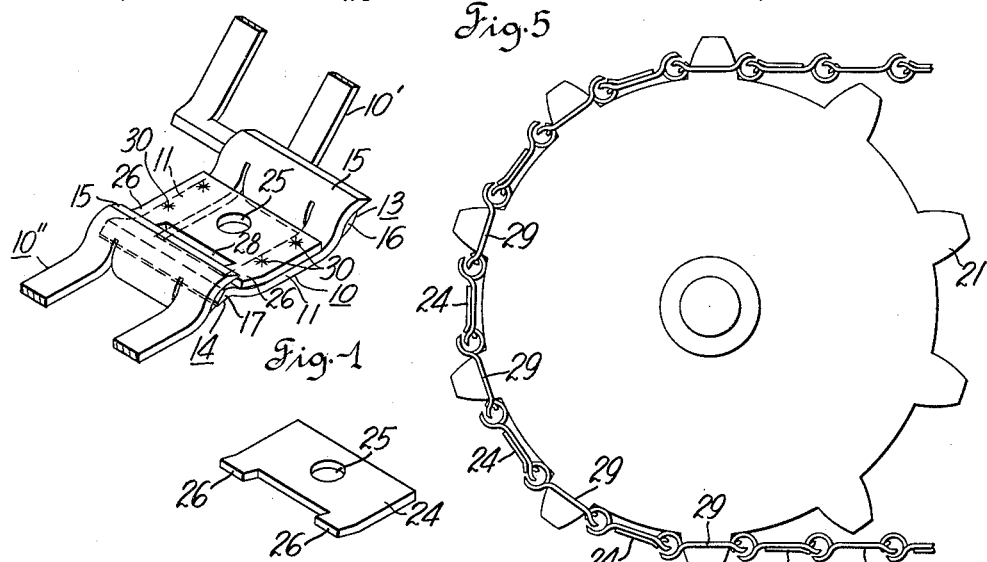
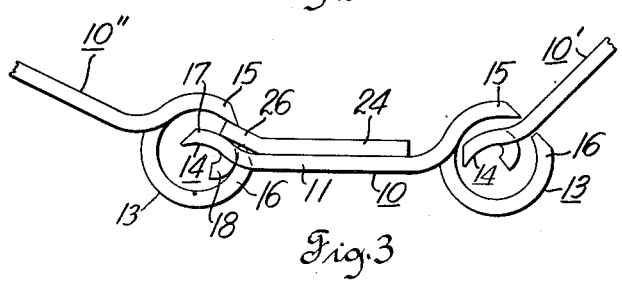
Inventor
Lester E. Oberholtz
by Robert W. Laktinen
Attorney ized Aug. 7, 1962

3,048,049
CONVEYER CHAIN
Lester E. Oberholtz, Independence, Mo., assignor to Allis-Chalmers Manufacturing Company, Milwaukee, Wis.
Filed Mar. 4, 1960, Ser. No. 12,770
3 Claims. (Cl. 74—248)

This invention relates generally to drive chains for the transmission of mechanical power and more particularly to such chains of the detachable link type.

Raddle type conveyers, which are frequently used in agricultural machinery, are commonly formed of two endless chains and connecting slats between the chains. The links of the chains are detachably interconnected and have rectangular apertures to accommodate the teeth of sprocket wheels which cooperate with the chains. The slats are usually secured to short cross bars which are carried by some of the links and which obstruct the apertures of the links to which they are secured. Accordingly, provision must be made with respect to the drive and idler sprockets over which the chains pass to accommodate the links which are closed by cross bars. One method is to provide sprockets on which one tooth has been omitted at that point of the periphery opposite which the links closed by the cross bars will lie when they reach the periphery of the sprocket wheels. A simpler method of so providing which has greater flexibility is to utilize sprockets with teeth that register with every other link making it possible to attach a cross slat to any alternate link.

The benefits of this flexible design can be defeated, when using a detachable link chain, by inadvertent misassembly or replacement of links allowing two open links or two closed links to be connected in succession causing the sprocket teeth to fail to register properly as the chain passes over it.

In practice when such a chain is used affording detachability at every link junction, the necessity of meticulous alternate link assembly must be impressed upon those who may repair or replace parts on a machine. The need for detailed servicing instruction is vexatious, and experience has shown that operators, particularly those who make adjustments in the field, may be unaware of the problem or disregard instructions and attempt to adjust the chains by removal or addition of a single link. The result of such improper procedure is a mismatch of the chain with the sprocket teeth and consequent chain rupture.

The present invention overcomes this problem by providing a novel and economical method of inseparably pairing detachable chain links to prevent accidental or inadvertent misassembly.

It is an object of this invention to provide a drive chain of the detachable link type, having slat mounting cross bars, which cannot be misassembled.

It is a further object of this invention to provide an improved arrangement for inseparably pairing detachable type chain links.

It is a further object to provide an inseparably paired link structure without an increase in the number of component parts or a complication of link assembly procedure.

Referring to the drawings:

FIG. 1 is an isometric view of a chain link with a cross bar and portions of adjoining separable and nonseparable links;

FIG. 2 is an isometric view of the cross bar;

FIG. 3 is a side view of a flexed chain showing a full link with a cross bar mounted thereon with one adjoining partial link pivoted to a position allowing separation and the other adjoining partial link pivoted to one maximum angular position affording inseparability;

FIG. 4 is a side view of a chain, with cross bars on alternate links, trained over a sprocket; and FIG. 5 is a plan view of part of a conveyer raddle comprising a pair of detachable link drive chains and connecting slats therebetween, center portions of the slats being omitted.

Referring to FIGS. 1 and 3 a generally rectangular single piece link body 10 is of generally conventional form and formed by stamping from a single blank of sheet metal. The link body 10 is comprised of a pair of longitudinal side bars 11 with a hook or bushing portion 13 at one end and a pintle portion 14 at the opposite end. The hook portion is formed by bending the end 15 of the blank in an arcuate configuration with a portion 16 of the material which has been stamped from between the side bars being turned in the opposite direction to form a continuous unclosed arcuate configuration as shown in the side view of FIG. 3. The gap between the hook or bushing portions 15 and 16 provides necessary clearance for assembly of adjoining links. At the opposite end, the pintle portion 14 is formed by effecting an upward curvature of the end 17 of the sheet metal blank while curving downwardly a portion 18 of the material stamped from between the side bars adjacent the pintle end 14 of the link.

In FIG. 3 with reference to the junction between the right end of link body 10 and the left end of the adjacent link body 10' it can readily be seen that in a specific position of angular relation between adjoining links there is no interference or transverse interlocking between the associated hook and pintle portions so that separation may be effected by moving the links transversely with respect to one another.

The cross bar shown in FIG. 2 has an opening 25 for mounting the raddle slat end portions of this embodiment and also has two prongs or projections 26 that extend longitudinally in laterally straddling relation to the adjacent hook portion 16 when the cross bar is mounted on the link. With the cross bar welded in position, the projections 26 extend in overlying relation along the side bar portions 11 leaving a central portion 28 of the link, between the side bars, open to accommodate anticlockwise pivotal movement, as viewed in FIG. 3, of the hook end portion 13 of the link body 10" about the pintle portion 14 of the link body 10. With the overlying projections 26 so disposed the upper portion 15 of the hook 13 of link 10" is prevented from pivoting clockwise, as viewed in FIG. 3, to the position where transverse disengagement of the links may be effected since the arcuate portion 15 formed from the end of the blank comes into contact with the projections 26 of the cross bar 24. This contact is made while transverse interference still occurs between the turned lower part of the hook portion 13, formed from material stamped from between the side bars 11 of the link 10", and the side bars 11 of the link body 10. By this means it is possible to form links in permanently joined pairs and since it is not possible to join two hook ends together or two pintle ends together, the chain can be neither misassembled nor have links removed or added in such a manner as to dispose two open or two cross bar links consecutively in the chain. As a result, rupture of the chain caused by mismatch between the chain and sprocket wheel teeth will be prevented.

A chain 20 (FIG. 4) is formed by the assembly of a series of permanently paired detachable links. The basic paired sections, links 10 and 10" of FIGS. 1 and 3, of this chain would be fabricated by connecting two similar links and mounting a cross bar 24 on the link which is coupled by its pintle end 14. The cross bar 24 is placed on the link 10 with the transversely spaced prongs 26 overlying the side bars 11 and extending toward the bushing end of the adjoining link 10". Link 10" will not interfere with this assembly while it is disposed with the bushing portion 16 extending between the side bars 11 of the link 10. While so positioned the cross bar is permanently secured to the link body 10 by spot welding the cross bar 24 to the side bars 11 at one or more locations 30 along each of the overlying side portions. The link 10 will therefore form an intermediate covered aperture link between alternate uncovered aperture links 10' and 10''.

FIG. 5 shows the chain above utilized in the environment of a raddle conveyer. Two stretches of chain 22 and 23 are shown with alternate corresponding links on each chain having a cross bar 24 mounted across the side bars. The cross bar, FIG. 2, which can more easily be seen in position on the link in the isometric view of FIG. 1, is commonly secured to the link side bars by spot welding. To the cross bars are connected the end portions of the conveyer cross slats 27 which are in this showing utilizing alternate cross bar connections.

FIG. 4 shows a chain 20 with cross bars 24 on alternate links trained over a sprocket 21 which clearly shows the necessity of having open links 29 alternately disposed in the chain to receive the sprocket teeth.

In general terms, a first link as represented by the link 10, and a second link as represented by the link 10'', each have side bars 11, a pintle bar 17, 18 and an end bar 15 connecting said side bars, and a curved end section 16 extending from the end bar 15 and presenting a free edge in spaced relation thereto so as to provide an open bearing. The pintle bar 17, 18 of the first link 10 is pivoted in the open bearing afforded by the curved end section 16 of the second link 10'', and a plate member, as represented by the cross bar 24, extends between and is secured to the side bars 11 of the first link 10. The plate member has a pair of prongs in straddling relation to the curved end section of the second link, such prongs being represented by the prongs 26, 26 of the cross bar 24. In the illustrated embodiment of the invention and as best shown in FIG. 3 and in the upper part of FIG. 4, the curved end section 16 of each link extends from its associated end bar 15 in downwardly projecting relation to the side bars 11, and the plate member is secured to the side bars of the first link 10 in overlying relation thereto. Further, as best shown in FIGS. 1 and 3, the prongs 26 of the plate member 24 project into the range of pivotal movement of the end bar 15 of the second link 10''.

It should be understood that the invention disclosed herein is not limited to the exact details and features of construction described herein, and that it includes various modifications embraced within the annexed claims.

What is claimed is:

1. The combination of a first and a second chain link each having side bars, a pintle bar and an end bar connecting said side bars, and a curved end section extending from said end bar and presenting a free edge in spaced relation thereto so as to provide an open bearing; the pintle bar of said first link being pivoted in said open bearing of said second link; and a plate member extending between and secured to said side bars of said first link, said plate member having a pair of prongs in straddling relation to said curved end section of said second link.

2. The combination set forth in claim 1 wherein said curved end section of each of said links extends from its associated end bar in downwardly projecting relation to said side bars; and wherein said plate member is secured to said side bars of said first link in overlying relation thereto.

3. The combination set forth in claim 1 wherein said curved end section of each of said links extends from its associated end bar in downwardly projecting relation to said side bars; wherein said plate member is secured to said side bars of said first link in overlying relation thereto; and wherein said prongs of said plate member project into the range of pivotal movement of the end bar of said second link.

References Cited in the file of this patent
UNITED STATES PATENTS

| | | |
|---|---|---|
| 1,184,260 | Prindle | May 23, 1916 |
| 1,527,146 | Litchfield et al. | Feb. 17, 1925 |
| 1,638,267 | Morehead et al. | Aug. 9, 1927 |
| 2,530,014 | Holmes | Nov. 14, 1950 |
| 2,877,888 | Wittenberger | Mar. 17, 1959 |